ns of

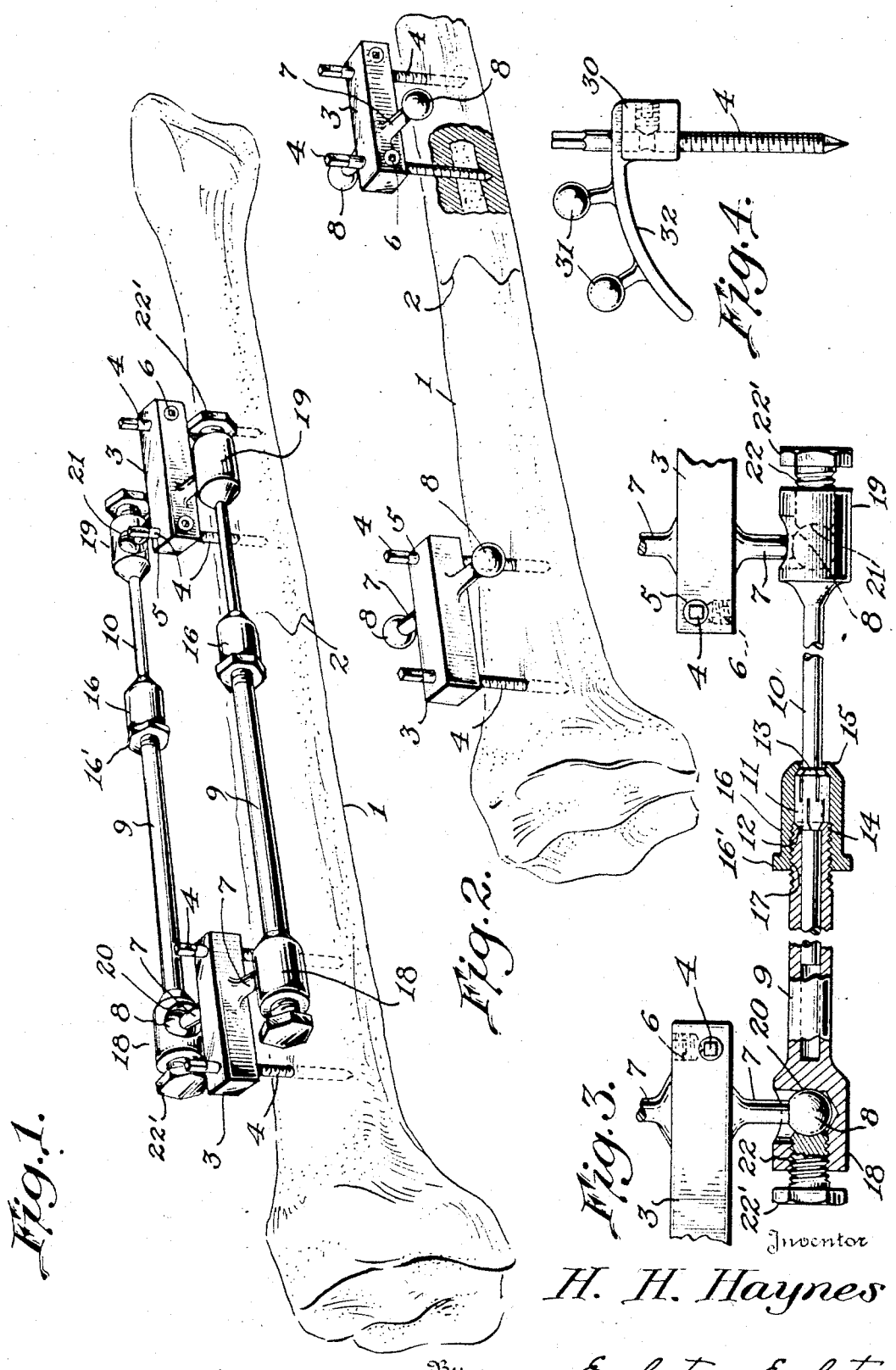

UNITED STATES PATENT OFFICE 2,238,870

AMBULATORY SPLINT

Herbert H. Haynes, Clarksburg, W. Va.

Application February 4, 1939, Serial No. 254,669

14 Claims. (Cl. 128—92)

This invention relates to an ambulatory fracture apparatus and has for one of its objects to provide a device of simple and inexpensive construction for the skeletal control of bone fragments during extension, reduction and fixation of a fracture.

Another object of the invention resides in the provision of base members or blocks which may be skeletally attached to the bone fragments by screws and thereafter manipulated to bring the ends of the bone fragments into the required relationship.

A further object of the invention consists in providing one or more extensible rods having ball and socket connections with the base members and means for locking the connections in fixed relationship whereby the base members and likewise the bone fragments are securely held in their adjusted position.

Another object of the invention consists in the provision of a skeletal splint which not only obviates the need of plaster casts which prevent access to flesh wounds and tend in themselves to create wounds, but which also secures the bone fragments in fixed relationship to such degree that the patient may in many instances use the fractured limb in the usual way while the bone fragments are in the process of uniting.

Other objects and advantages of the invention will be apparent from the following description when taken in connection with the accompanying drawing, in which, Figure 1 is a perspective view of the apparatus applied to a fractured leg bone.

Figure 2 is a similar view with the adjustable rods removed.

Figure 3 is an enlarged detail view of the ball and socket connection between one of the base members and a brace rod; and Figure 4 is an end view of a modified form of base member or block.

Referring to the drawing in more detail, the numeral 1 indicates a bone which has been fractured at the point 2 and is reset for the purpose of illustrating the structure of the splint and its manner of operation.

Attached to each of the bone fragments is an oblong base member or block 3 formed of metal. The base members are disclosed as attached to the bone fragments by pairs of skeletal screws 4 which are square at their upper ends for the reception of a wrench. The screws 4 pass through spaced openings 5 in the base members 3 and are fixedly secured with respect to the members 3 by means of set screws 6. It will be understood of course that the first screw 4 of either pair may be installed in the bone without relation to its base member 3. Before installing the second screw however it is essential that the base member be placed on the screw and the second screw inserted through its opening 5 and then projected into the bone. By this means the screws are properly spaced to receive the base member. The member 3 is then adjusted to its proper vertical position with respect to screws 4 and the set screws 6 are tightened to lock the member with respect to screws 4.

Integrally connected to each base member 3, as by means of shanks 7, is a pair of balls or heads 8. In Figures 1, 2 and 3 these members 8 are shown as positioned laterally of the base members 3 and fairly close to the inner ends thereof, i. e., the ends which are adjacent each other. Each member 8 forms one part of a ball and socket connection between its base member and an extensible rod or brace for connecting the two base members, and the purpose of having the elements 8 near the inner ends of the base members is to provide sufficient space for mounting the extensible connecting rods under certain conditions.

The rods for rigidly connecting the base members 3 and thereby fixedly securing the bone fragments are indicated by the numerals 9—10, the numeral 9 indicating a cylinder or sleeve for reception of the rod portion 10. The parts 9 and 10 are slidably connected but may be locked in any adjusted position by means of a gripping element 11 slidably mounted on rod 10. The element 11 has tapered or conical ends 12 and 13 for cooperation respectively with a flared end 14 on cylinder 9 and a tapered end 15 on a threaded thimble 16. The gripper 11 is slotted longitudinally to provide gripping fingers at its opposite ends and these are caused to forcefully grip rod 10 when the sleeve or thimble 16 is rotated to cause its threads 17 to move it further onto the cylinder 9. Rotation of the thimble 16 in the opposite direction will of course release the gripping element and allow the parts 9—10 to be extended or contracted. The exterior of the thimble is preferably shaped to receive a wrench as indicated at 16'.

The outer ends of the brace rods 9—10 are enlarged as indicated by numerals 18 and 19 and provided with sockets 20 and 21 respectively for reception of the ball members 8. Set screws 22, provided with suitable wrench receiving heads 22', are associated with each socket and serve to securely grip the ball between its end and a wall of the socket so as to prevent relative movement between the ball and socket members.

Figure 4 illustrates a base member 30 which is identical with those previously described except that the spherical heads or balls 31 are mounted on a laterally extending arcuate member 32 rather than on opposite sides of the base member. This construction of base member is desirable in certain cases, as where the bone being treated is more or less obstructed by muscles or other bones which tend to limit the area in which the skeletal screws may be installed.

The manner in which the base members are connected to the bone fragments has been described, and it now remans only to describe the steps of bringing the adjacent ends of the fracture into mating relationship and then firmly secure them in such position, not only for the purpose of holding the fragments while knitting but also for the purpose of allowing the patient to use the injured limb in many instances. After the base members are connected to the bone fragments they may be grasped by the surgeon for the purpose of extending the limb and also to rotate the fragments to secure proper alignment and mating of the ends; such position being determined with the aid of a fluoroscope if desired.

The next step consists in adjusting the lengths of the rods 9—10 to correspond with the distance between the balls on the respective base members. When this has been done the sockets 20 and 21 are placed over the balls and the thimbles 16 are tightened up so as to lock the rods against further contraction, extension or rotation. Set screws 22 are now screwed into position so as to securely clamp the balls 8 and thereby lock the rods in fixed relation with respect to the base members 3.

With the foregoing steps completed the fracture is set and the bone fragments will be securely held in position until the bone is knit and the apparatus removed. This splint is intended for use without a plaster cast, thereby leaving the fleshy part of the limb exposed for treatment. Moreover, with this rigid connection between the bone fragments the patient, in many instances, may use the limb in the usual way, and the parts are so constructed and designed as to permit the wearing of ordinary street clothing from the time the fracture is set. For this reason the splint has been referred to as an ambulatory splint. By this term is meant a splint which will permit the patient to continue substantially normal use of the affected part, but it is in no sense intended to limit the specification and claims to a splint for a leg. Moreover the term ambulatory splint as here used is intended to exclude splints which are employed in conjunction with plaster casts and which would therefore prevent substantially normal use of the affected part.

It should also be noted that the ball and socket connections between the rods 9—10 and base members 3 are an important feature of the invention. In many instances, which need not be described in detail, it is impossible for the surgeon to secure the base members 3 in substantial alignment such as indicated in Figure 1, also the rotation of the bone fragments so as to secure proper mating of the ends mitigate against substantial alignment, nevertheless the ball and socket connections between the base members and rods permit the base members to be securely locked in their adjusted positions. The mounting of the rods in cases of nonalignment of the base members is facilitated by the fact that the balls 8 are disposed adjacent the inner ends of these members, thereby permitting the rods to extend at a substantial angle to the base members without coming into contact with the inner ends thereof. Furthermore, in extreme cases of dis-alignment, base members such as shown at 30 in Figure 4 may be employed and mounted with their parts 32 extending in opposite direction, or one of such members may be used in conjunction with one of the members 3 shown in Figures 1 and 2. Also in some instances it may be desirable to employ a combination of one of the base members 3 with one of the pin and yoke connections shown in my copending application Ser. No. 198,122, filed March 25, 1938, for Ambulatory splint.

From the foregoing description and the accompanying drawing, it will be apparent that I have devised an exceedingly simple construction of skeletal splint which is designed to rigidly and securely hold the ends of the bone fragments in abutting relationship; that the construction is such as to provide this rigidity regardless of the angular relation of the connections to the bone fragments; that the parts are so proportioned and designed as to extend only a slight distance beyond the fleshy part of the limb, thereby permitting the use of ordinary clothing; and that the rigidity of the apparatus is such as to admit, in many instances, of the patient continuing his daily duties in the usual way.

In accordance with the patent statutes I have described what I now believe to be the preferred forms of the invention, but inasmuch as various changes may be made in the structural details without departing from the spirit of the invention it is intended that such changes be included within the scope of the appended claims.

What is claimed is:

1. In a splint a base member comprising a block of sufficient thickness to form a bearing for a skeletal screw, and one element of a ball and socket connection mounted on the block.

2. In a splint a base member comprising a block of sufficient thickness to form a bearing for a skeletal screw, and a pair of ball members secured to the block.

3. In a splint a base member comprising a block, an arcuate extension rigidly connected to the block, and one member of a ball and socket connection mounted on the extension.

4. In a splint a base member comprising a block, an arcuate extension rigidly connected to the block, and a pair of ball members secured to said extension.

5. An ambulatory splint comprising a pair of block-like base members of sufficient thickness to provide a bearing for skeletal screws, a pair of skeletal screws associated with each base member for connecting the same to a bone fragment, an extensible rod, and separable ball and socket connections between the base members and the respective ends of the rod.

6. An ambulatory splint comprising a pair of block-like base members of sufficient thickness to provide a bearing for skeletal screws, a pair of skeletal screws associated with each base member for connecting the same to a bone fragment, an extensible rod, separable ball and socket connections between the base members and the respective ends of the rod, and means locking each of said ball and socket connections against movement.

7. An ambulatory splint comprising a pair of block-like base members of sufficient thickness to provide a bearing for skeletal screws, skeletal screws associated with each base member for attaching the same to bone fragments, a substantially spherical head fixed to each base member, and an extensible rod provided with a socket at each end releasably engaging the heads.

8. An ambulatory splint comprising a pair of block-like base members of sufficient thickness to provide a bearing for skeletal screws, skeletal screws associated with each base member for attaching the same to bone fragments, a substantially spherical head fixed to each base member, an extensible rod provided with a socket at each end releasably engaging the heads, and means locking each socket and head against relative movement.

9. An ambulatory splint comprising a pair of block-like base members of sufficient thickness to provide a bearing for skeletal screws, skeletal screws associated with each base member for attaching the same to bone fragments, an extensible rod, separable ball and socket connections between the respective ends of the rod and the base members, means locking said ball and socket connections against relative movement, and screw-threaded means locking the extensible rod in adjusted positions.

10. An ambulatory splint comprising a pair of block-like base members of sufficient thickness to provide a bearing for skeletal screws, skeletal screws associated with each base member for attaching the same to bone fragments, a pair of extensible rods, separable ball and socket connections between the respective ends of the rods and the base members, and means locking each ball and socket connection against movement.

11. An ambulatory splint comprising a pair of block-like base members of sufficient thickness to provide a bearing for skeletal screws, skeletal screws associated with each base member for attaching the same to bone fragments, a pair of extensible rods, a ball member mounted on each side of each base member, sockets formed on the ends of the extensible rods and detachably engaging the ball members, and means locking the ball and socket connections against movement.

12. An ambulatory splint comprising a pair of block-like base members of sufficient thickness to provide a bearing for skeletal screws, skeletal screws associated with each base member for attaching the same to bone fragments, a pair of extensible rods, a ball member mounted on each side of each base member adjacent the end nearer the other base member, sockets formed on the ends of the extensible rods and detachably engaging the ball members, and means locking the ball and socket connections against movement.

13. An ambulatory splint comprising a pair of block-like base members of sufficient thickness to provide a bearing for skeletal screws, skeletal screws associated with each base member for attaching the same to bone fragments, a pair of extensible rods, a gripper locking each of said rods in adjusted positions, detachable ball and socket connections between the ends of the rods and the base members, and set screws locking the ball and socket connections against movement.

14. In an ambulatory splint a base member comprising a block of sufficient thickness to form a bearing for a skeletal screw, said block provided with an elongated, transversely-extending opening of a diameter substantially that of a skeletal screw, a set screw mounted in the block and adapted to extend transversely of the opening for engaging a skeletal screw mounted therein, and one element of a ball and socket connection mounted on the block.

H. H. HAYNES.